United States Patent
Schneider et al.

(10) Patent No.: US 10,259,387 B1
(45) Date of Patent: Apr. 16, 2019

(54) ILLUMINATED VEHICLE INTERIOR ASSEMBLY SUCH AS A SAFETY BELT BUCKLE ASSEMBLY

(71) Applicant: JVIS-USA, LLC, Sterling Heights, MI (US)

(72) Inventors: Ingo E. Schneider, Washington, MI (US); Richard L. Arundale, Leonard, MI (US); Remon S. Jiddou, Sterling Heights, MI (US)

(73) Assignee: JVIS-USA, LLC, Sterling Heights, MI (US)

( * ) Notice: Subject to any disclaimer, the term of this patent is extended or adjusted under 35 U.S.C. 154(b) by 0 days.

(21) Appl. No.: 15/784,413

(22) Filed: Oct. 16, 2017

(51) Int. Cl.
| | |
|---|---|
| *B60Q 3/242* | (2017.01) |
| *B60Q 3/64* | (2017.01) |
| *B60Q 3/53* | (2017.01) |
| *F21V 8/00* | (2006.01) |
| *B60Q 3/82* | (2017.01) |
| *B60Q 3/85* | (2017.01) |

(52) U.S. Cl.
CPC .............. *B60Q 3/64* (2017.02); *B60Q 3/242* (2017.02); *B60Q 3/53* (2017.02); *G02B 6/0055* (2013.01); *B60Q 3/82* (2017.02); *B60Q 3/85* (2017.02); *G02B 6/0093* (2013.01)

(58) Field of Classification Search
CPC .................................. B60Q 3/242; B60Q 3/82
See application file for complete search history.

(56) References Cited

U.S. PATENT DOCUMENTS

| | | | |
|---|---|---|---|
| 4,237,586 A | 12/1980 | Morinaga | |
| 4,365,285 A | 12/1982 | Brundidge | |
| 4,933,818 A | 6/1990 | Eckmann | |
| 5,005,108 A | 4/1991 | Pristash et al. | |
| 5,132,880 A | 7/1992 | Kawamura | |
| 5,149,189 A | 9/1992 | Kawamura | |
| 5,176,439 A * | 1/1993 | Kawamura | A44B 11/2565 362/108 |
| 5,181,773 A | 1/1993 | Colvin | |

(Continued)

FOREIGN PATENT DOCUMENTS

GB        2492111 A    12/2012

OTHER PUBLICATIONS

United States Patent and Trademark Office, Notice of Allowance for U.S. Appl. No. 15/784,378, dated Oct. 22, 2018.

(Continued)

*Primary Examiner* — Donald L Raleigh
(74) *Attorney, Agent, or Firm* — Brooks Kushman P.C.

(57) ABSTRACT

An illuminable vehicle interior assembly such as safety belt buckle assembly is provided. An illumination module includes a substrate, a light source supported on the substrate to emit incoherent visible light rays through a light emitting surface of the light source and a driver supported on the substrate to controllably supply electrical power to the light source based on a command signal from a remote electronic control unit over a vehicle bus. A lens is molded in a molding process to have a light transmissive output surface and a light transmissive input surface aligned with the light source. The lens gathers and receives the light rays at the input surface and redirects gathered light rays to the output surface to generate light in a pattern of substantially uniform intensity into a passenger compartment of a vehicle.

13 Claims, 4 Drawing Sheets

(56) References Cited

U.S. PATENT DOCUMENTS

| | | |
|---|---|---|
| 5,438,492 A | 8/1995 | Collins et al. |
| 5,542,694 A | 8/1996 | Davis |
| 5,549,323 A | 8/1996 | Davis |
| 5,558,364 A | 9/1996 | Davis |
| 5,892,436 A | 4/1999 | Blackburn et al. |
| 5,895,115 A | 4/1999 | Parker et al. |
| 5,944,135 A | 8/1999 | Blackburn et al. |
| 6,053,526 A | 4/2000 | Preisler et al. |
| 6,062,595 A | 5/2000 | Ha |
| 6,102,440 A | 8/2000 | Bergkessel |
| 6,158,867 A | 12/2000 | Parker et al. |
| 6,193,399 B1 | 2/2001 | Hulse |
| 6,464,381 B2 | 10/2002 | Anderson, Jr. et al. |
| 6,558,027 B2 | 5/2003 | Ellis et al. |
| 6,594,417 B1 | 7/2003 | Hulse |
| 6,652,128 B2 | 11/2003 | Misaras |
| 6,676,472 B1 | 1/2004 | Trentelman |
| 6,974,238 B2 | 12/2005 | Sturt et al. |
| 7,150,550 B2 | 12/2006 | Bogdan et al. |
| 7,201,588 B2 | 4/2007 | Nishigaki et al. |
| 7,237,933 B2 | 7/2007 | Radu et al. |
| 7,275,613 B2 | 10/2007 | Park |
| 7,299,892 B2 | 11/2007 | Radu et al. |
| 7,347,579 B2 | 3/2008 | Kohama et al. |
| 7,360,794 B2 | 4/2008 | Kohama |
| 7,387,397 B2 | 6/2008 | Konet et al. |
| 7,441,801 B2 | 10/2008 | Nakamura et al. |
| 7,568,265 B2 | 8/2009 | Kohama |
| 7,866,858 B2 | 1/2011 | Hirzmann |
| 7,942,565 B2 | 5/2011 | Klick et al. |
| 7,987,030 B2 | 7/2011 | Flores et al. |
| 8,016,465 B2 * | 9/2011 | Egerer .................... B60R 13/02 362/23.01 |
| 8,061,861 B2 | 11/2011 | Paxton et al. |
| 8,075,173 B2 | 12/2011 | Shallcross et al. |
| 8,162,519 B2 | 4/2012 | Salter et al. |
| 8,210,564 B2 | 7/2012 | Halmstetter et al. |
| 8,215,810 B2 | 7/2012 | Welch, Sr. et al. |
| 8,235,567 B2 | 8/2012 | Hipshier et al. |
| 8,256,945 B2 | 9/2012 | Choquet |
| 8,408,627 B2 | 4/2013 | Mann |
| 8,408,766 B2 | 4/2013 | Wilson et al. |
| 8,425,062 B2 | 4/2013 | Bowden et al. |
| 8,449,161 B2 | 5/2013 | Igoe et al. |
| 8,469,562 B2 | 6/2013 | Marzorati et al. |
| 8,596,803 B2 | 12/2013 | Schultz et al. |
| 8,627,586 B2 | 1/2014 | Bozio et al. |
| 8,816,586 B2 | 8/2014 | Marcove et al. |
| 8,925,959 B2 | 1/2015 | Bosch et al. |
| 9,006,751 B2 * | 4/2015 | Kleo ................. B32B 17/10036 257/82 |
| 9,067,556 B2 | 6/2015 | Bosch et al. |
| 9,151,485 B2 | 10/2015 | Woodham |
| 9,211,866 B1 * | 12/2015 | Line ....................... B60Q 3/242 |
| 9,376,055 B2 | 6/2016 | Sura et al. |
| 9,434,348 B2 | 9/2016 | Schlaps |
| 9,446,734 B2 | 9/2016 | Bosch et al. |
| 9,463,734 B2 | 10/2016 | Salter et al. |
| 9,481,296 B2 | 11/2016 | Roberts et al. |
| 9,481,318 B2 * | 11/2016 | Schmotzer ........ A44B 11/2565 |
| 9,896,059 B2 * | 2/2018 | Fujii ...................... B60R 22/12 |
| 10,041,650 B2 * | 8/2018 | Salter ...................... B60R 7/06 |
| 2001/0033492 A1 | 10/2001 | Rogers et al. |
| 2003/0209889 A1 | 11/2003 | Erwin et al. |
| 2004/0060761 A1 * | 4/2004 | Almaraz ................ B60R 22/48 180/268 |
| 2005/0174791 A1 * | 8/2005 | Bynum .................... B60Q 3/82 362/490 |
| 2006/0087826 A1 * | 4/2006 | Anderson, Jr. ........ B60K 35/00 362/23.01 |
| 2006/0187659 A1 * | 8/2006 | Nawashiro ............. H01H 9/181 362/234 |
| 2007/0236917 A1 * | 10/2007 | Gray .................. A44B 11/2546 362/108 |
| 2009/0021459 A1 | 1/2009 | Satou et al. |
| 2009/0251912 A1 * | 10/2009 | Kino ........................ B60Q 3/82 362/492 |
| 2009/0251917 A1 | 10/2009 | Wollner et al. |
| 2010/0104780 A1 | 4/2010 | Paxton et al. |
| 2010/0194080 A1 | 8/2010 | Paxton et al. |
| 2011/0002138 A1 | 1/2011 | Hayes et al. |
| 2012/0089302 A1 * | 4/2012 | Griffin .................... B60R 21/00 701/45 |
| 2012/0188779 A1 | 7/2012 | Schultz et al. |
| 2012/0217767 A1 | 8/2012 | Pennington |
| 2013/0279188 A1 | 10/2013 | Entenmann et al. |
| 2013/0329447 A1 | 12/2013 | Broer et al. |
| 2014/0077531 A1 | 3/2014 | Preisler et al. |
| 2014/0239853 A1 * | 8/2014 | Woodham ........... F21V 33/0064 315/362 |
| 2014/0268844 A1 | 9/2014 | Knoedl |
| 2015/0298607 A1 * | 10/2015 | Salter ...................... B60Q 3/82 315/77 |
| 2015/0307033 A1 * | 10/2015 | Preisler .................. B60R 13/02 362/488 |
| 2016/0031367 A1 * | 2/2016 | Salter .................... G02B 6/0096 362/583 |
| 2017/0122500 A1 * | 5/2017 | Tavernese ................. F21K 9/30 |
| 2017/0282789 A1 * | 10/2017 | Ohashi ................... B60Q 3/225 |
| 2018/0065548 A1 * | 3/2018 | Fries ........................ G02B 6/00 |
| 2018/0192171 A1 * | 7/2018 | Fang ........................ H04R 1/02 |

OTHER PUBLICATIONS

United States Patent and Trademark Office, Non-Final Office Action for U.S. Appl. No. 15/784,378, dated Jul. 27, 2018.

* cited by examiner

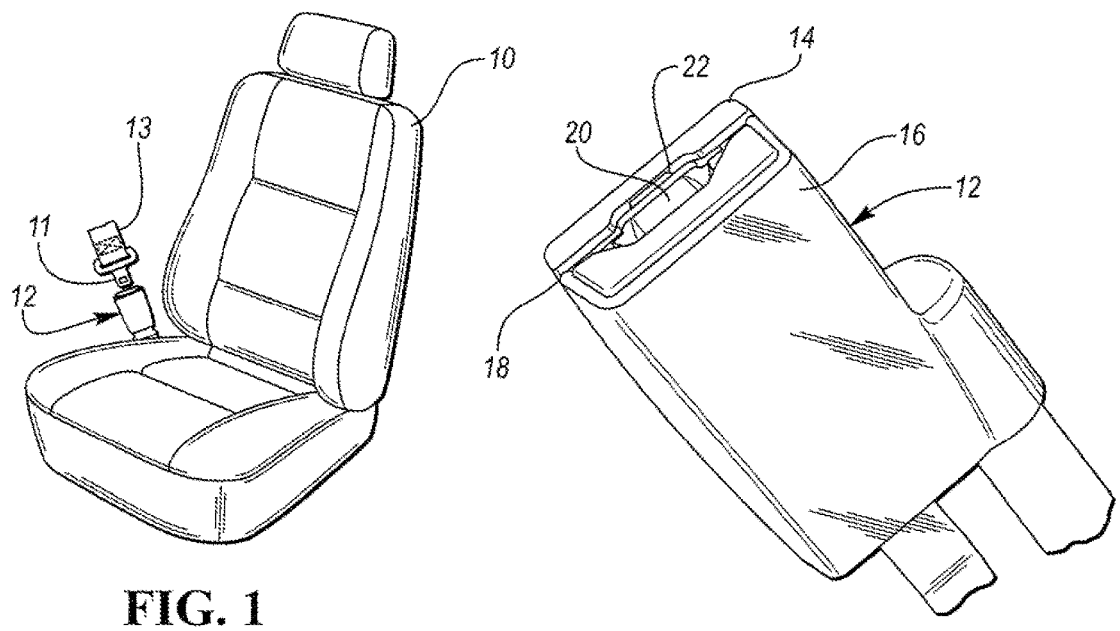
FIG. 1
FIG. 2
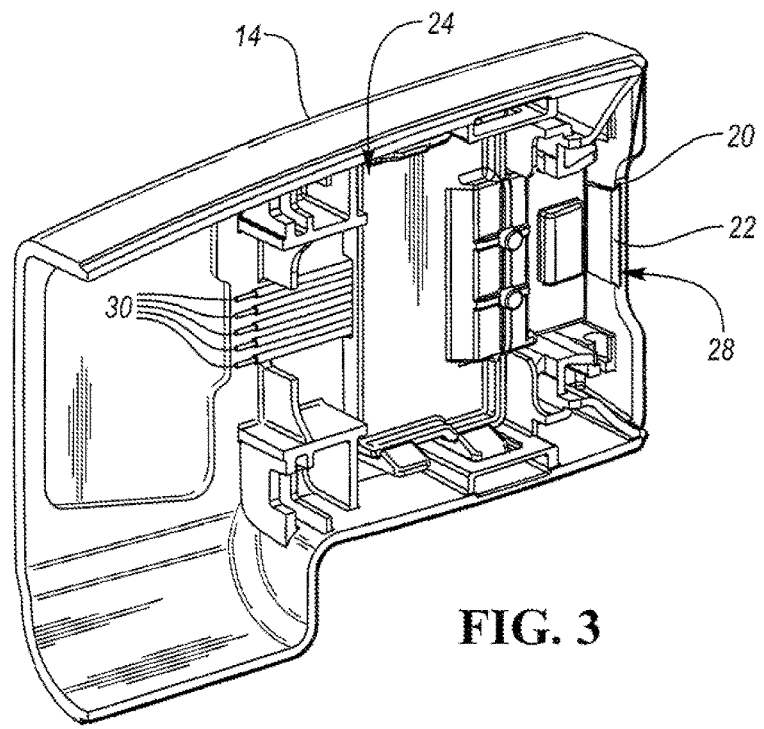
FIG. 3

ILLUMINATED VEHICLE INTERIOR ASSEMBLY SUCH AS A SAFETY BELT BUCKLE ASSEMBLY

CROSS REFERENCE TO RELATED APPLICATIONS

This application is a continuation-in-part application of U.S. patent application Ser. Nos. 15/637,054 and 15/677,517, both filed on Jun. 29, 2017. This application is related to U.S. Patent application entitled "Illuminator Assembly for a Safety Belt Buckle" Ser. No. 15/784,378, filed on the same day as this application.

TECHNICAL FIELD

This invention generally relates to illumination of conventional safety belt buckles and, in particular, to assemblies for use with such buckles.

BACKGROUND

As described in U.S. Pat. No. 6,676,472, generally, there are two distinct types of lighting applications. In one, direction of the light rays is relatively unimportant. In the other, light rays must be directed in a particular manner subsequent to their generation. With respect to automotive lighting, after light rays are generated by a lamp, they must by focused/dispersed according to somewhat exacting standards. The requirements for light-directed lamps, such as headlights, sidemarkers, tail lights, brake lights, directional, hazards, CHMSLs (Center, high-mounted, stop slights), differ. However, they all share the characteristic that their light rays need to be directed in some specific manner.

Lamp elements generate light rays and lenses and/or reflecting elements direct the light rays. Lamp elements generally fall into three categories: light-emitting diode (LED), incandescent and discharge.

Discharge lamps are generally characterized as having a sealed envelop filled with a gas, the atoms/ions of which, when properly excited, give off light rays. Lens elements may be categorized as refractive, Fresnel, or Total Interal Reflection (TIR). TIR lenses have the ability to gather light rays from large solid angles and redirect them efficiently.

Interior lighting systems for automotive and other vehicle applications are generally used for two purposes. One is to provide general area illumination and the other is feature lighting of specific objects, either for aesthetic or functional reasons. Traditionally, these interior lighting systems have utilized incandescent lamps for both area and feature lighting, often using lenses to control the shape and light intensity distribution of the emitted light rays. Although incandescent lamp systems can often be integrated into various vehicle interior trim components in a simple manner, various considerations do arise which complicate their use for automotive lighting. For example, where heat from the lamp could damage adjacent components or otherwise cause problems, thermal management of that heat must be implemented. Also, there is often little room in or behind a particular vehicle interior body panel or trim component for the lamp, its socket, and lensing.

More recently, distributed light systems have found use in vehicles. These may use fiber optics or other means to deliver the light rays to a desired location. The use of a lens and focusing or dispersing devices may be employed to direct the light rays. It is well known that light transparent members including for example rods, panels, films, sheets and plates, can be made into light emitting members or illuminators by grooving or notching the members in a certain pattern.

Fiber optic substrates can be made into illuminators by marring or abrading the surface of the optical fibers at various points along their length to cause a portion of the light entering one or both ends of the optical fibers to be emitted from the marred surface areas.

Increased surface marring results in increased light emission. Accordingly, the intensity of the light emitted along the length of the substrates can be varied by varying the density or aggressiveness of the surface marring.

Such areas as foot wells, door handles, seats, trucks, cargo areas, dashboards, door sills, headliners, grab handles, etc. may be illuminated using a wide combination of technologies. In addition to incandescent lights and fluorescent lighting, LED illumination, cold cathode technology, and electroluminescent technology may now find use.

Under 49 C.F.R. Part 571.101 (FMVSS 101) 5.53 Illumination, 55.3.4 Brightness of interior lamps.

(a) Any source of illumination within the passenger compartment which is forward of a transverse vertical plane 110 mm rearward of the manikin "H" point with the driver's seat in its rearmost driving position, which is not used for the controls and displays regulated by this standard, which is not a telltale, and which is capable of being illuminated while the vehicle is in motion, shall have either:

(1) Light intensity which is manually or automatically adjustable to provide at least two levels of brightness;

(2) A single intensity that is barely discernible to a driver who has adapted to dark ambient roadway conditions; or (3) A means of being turned off.

One practice in the automotive industry is utilization of all-plastic, fabricated parts, such as, but not limited to, instrument panels, interior trims, and door panels. It is known in other automotive parts areas that different, aesthetically pleasing outer class A surfaces enhance the overall appearance of the interior of automotive vehicles.

The following patent documents are related to the present invention: UK Patent Application GB 2492100A; U.S. Pat. Nos. 5,005,108; 5,549,323; 5,542,694; 5,558,364; 5,895,115; 6,062,595; 6,053,526; 6,158,867; 6,193,399; 6,464,381; 6,594,417; 6,652,128; 6,676,472; 6,974,238; 7,150,550; 7,201,588; 7,237,933; 7,299,892; 7,387,397; 7,441,801; 7,866,858; 7,987,030; 8,016,465; 8,061,861; 8,075,173; 8,162,519; 8,210,564; 8,215,810; 8,235,567; 8,256,945; 8,408,627; 8,408,766; 8,425,062; 8,449,161; 8,469,562; 8,596,803; 8,627,586; 8,816,586; 8,925,959; 8,067,556; 9,446,734, 9,376,055; and 9,481,296; and U.S. Published Applications 2003/0209889; 2009/0021459; 2009/0251917; 2010/0104780; 2010/0194080; 2011/0002138; 2012/0188779; 2012/0217767; 2013/0279188; 2013/0329447; 2014/0077531; and 2015/0307033.

U.S. published application 2013/0329447 discloses a lighting assembly comprising an optical fiber light guide panel member having a light conducting core cladded on opposite sides by cladding made of optically transparent material having a lower index of refraction than the light conducting core to cause total internal reflection of conducted light within the light conducting core at the core-cladding interface. Disruptions at one or more areas of the cladding cause conducted light within the light conducting core to be emitted from one or more areas of the panel member. Electrical circuitry is bonded to one or both sides of the cladding. One or more LEDs embedded in the panel member are electrically coupled to the electrical circuitry and optically coupled to the light conducting core.

Polymethyl methacrylate (PMMA), also known as acrylic or acrylic glass as well as by the trade names Plexiglas, Acrylite, Lucite, and Perspex among several others, is a transparent thermoplastic often used in sheet form as a lightweight or shatter-resistant alternative to glass. The same material can be utilized as a casting resin, in inks and coatings, and has many other uses.

Polycarbonates (PC) are a group of thermoplastic polymers containing carbonate groups in their chemical structures. Polycarbonates used in engineering are strong, tough materials, and some grades are optically transparent. They are easily worked, molded, and thermoformed.

Polymers such as PMMA and PC can be made into a diffusing polymer in a number of ways such as by adding light diffusing material such as self-reflecting particles to the polymers.

The broad concept of illuminating safety belt buckles is over 35 years old based on the patent literature. The challenges include packaging of the illuminator assembly within the buckle housing, energy management and optical quality. The following is a summary of prior art approaches to illuminating the safety belt buckle, or the environs of the buckle.

Woodham—U.S. Pat. No. 9,151,485, issued Oct. 6, 2015. FIG. 2 of the Woodham discloses a buckle assembly configured to releasably interlock with a seat belt tongue. The assembly includes a light emitting diode (LED) configured to emit a light when the seat belt tongue is not interlocked with the assembly. An optional guide is positioned at least partially within a housing and composed of a substantially light transmitting material. The LED is positioned such that the light emitted by the LED passes through the optical guide.

Morinaga—U.S. Pat. No. 4,237,586, issued Dec. 9, 1980. FIGS. 10 and 15 of Morinaga disclose an illuminated seat belt buckle with a light emitting diode 307 whose light output is projected through a light scattering lens 305$i$. See col. 7, 11. 36-39.

Brundidge—U.S. Pat. No. 4,365,285, issued Dec. 21, 1982. FIG. 3 of Brundidge discloses a seat belt buckle assembly with a fiber optic display 28 that is actuated by a switch 34 that toggles upon the engagement of the belt tongue with the buckle.

Eckmann—U.S. Pat. No. 4,933,818, issued Jun. 12, 1990. FIG. 3 of Eckmann is a cross-sectional view of a lighted buckle housing 10. A point of light 15 and a light outlet 16 are both in the area of the buckle opening. A light emitting diode 18 is disposed in a lamp holder 17. A light conducting path 19 is composed of several light guide segments 20, 21 and 23, which branch off a tap 22 in the light-conducting path.

Schlaps—U.S. Pat. No. 9,434,348, issued Sep. 6, 2016. FIG. 1 of Schlaps discloses a seatbelt latch circuit that can include an illumination source configured to illuminate a seatbelt latch in response to a signal. The seatbelt latch circuit can also include a status sensor configured to output a first current if the seatbelt latch is in a removed state, output a second current if the seatbelt latch is in an inserted state and output a third current if the seatbelt latch has a fault. The seatbelt latch circuit communicates with a vehicle electrical system through only two conductors.

Kawamura—U.S. Pat. No. 5,132,880, issued Jul. 21, 1992. FIG. 1 (diagrammatic) and FIG. 2 (schematic) of Kawamura disclose an illuminated seat belt buckle in which an optical fiber F transmits light to an ejector 2 formed of a light-transmitting material such as transparent plastic.

Kawamura—U.S. Pat. No. 5,149,189, issued Sep. 22, 1992. FIGS. 1 and 2 of Kawamura illustrate a seat belt buckle 1 with a luminous cover section 21. An LED is positioned within the buckle and below the luminous cover section 21.

Colvin—U.S. Pat. No. 5,181,773, issued Jan. 26, 1993. FIG. 6 of Colvin is a representative embodiment of an illuminated seat belt buckle in which an LED light source 52 is shrouded by a translucent cover portion 38.

Kawamura—U.S. Pat. No. 5,176,439, issued Jan. 5, 1993. FIG. 1 of Kawamura discloses a seat belt buckle illuminated by LEDs 1 whose light output is transmitted through a light guide 2 with total internal reflection. A V-shaped notch $2d$ in portion $2b$ of the light guide forms a reflecting prism. An ejector 20 is formed of a light-transmissive material, such as a clear polymeric material. A V-shaped recess 21 formed within the ejector also functions as a prism to reflect and guide light to the front of the ejector.

Collins et al—U.S. Pat. No. 5,438,492, issued Aug. 1, 1995. FIGS. 12 and 13 of Collins et al are, respectively, plan and side elevational views of an illuminated seat belt buckle 22. An LED 200 is placed in a chamber 202 within the buckle 22, and energized by wires routed from a plug-in connector 214.

Blackburn et al—U.S. Pat. No. 5,892,436, issued Apr. 6, 1999. FIGS. 1 and 5 of Blackburn et al illustrate a seat belt buckle illuminated by optical fibers 72 emanating from a light source 70.

Blackburn et al—U.S. Pat. No. 5,944,135, issued Aug. 31, 1999. FIG. 2 of Blackburn et al illustrates an illuminated seat belt buckle with a field effect locking indicator.

Bergkessel—U.S. Pat. No. 6,102,440, issued Aug. 15, 2000. FIG. 2 of Bergkessel shows a seat belt system fitted with a compliance light 10 and a buckle lock 24.

Griffin—US 2012/0089302, published Apr. 12, 2012. FIG. 1 of Griffin discloses a seat belt system for a vehicle which may include a plurality of seat belt assemblies each including a seat belt receptable, a light source for selectively illuminating the receptable, and a latch mechanism for releasably latching a seat belt buckle to the receptable. A controller may be operatively associated with the light source, the latch mechanism sensor, a transmission gear position sensor, and at least one of a door position sensor, engine sensor and air bag sensor. The controller may operably process signals received from the sensors and direct the light source to selectively illuminate the seat belt receptacle in various operational conditions of the vehicle.

Rogers et al—US 2001/0033492, published Oct. 25, 2001. FIG. 2 of Rogers et al illustrates an illuminated seat belt buckle in which an illuminator 54 transmits light through a U-shaped light pipe 62 to the buckle opening.

Gray et al—US 2007/0236917, published Oct. 11, 2007. Gray et al discloses a lighted and heated seat belt buckle.

Knoedl—US 2014/0268844, published Sep. 18, 2014. Knoedl discloses an illuminated seat belt buckle. FIG. 2 is an exploded isometric view of the lighting device 26 that illuminates the insertion aperture of the buckle.

Ellis et al—U.S. Pat. No. 6,558,027, issued May 6, 2003. FIG. 2 of Ellis et al discloses a push button seat belt buckle with an illuminated electroluminescent panel.

Park—U.S. Pat. No. 7,275,613, issued Oct. 2, 2007. Park discloses an automatic seat belt system that automatically unlocks if the ignition key is removed. A buckle lamp 20 is a secondary feature of the system.

Kohama—U.S. Pat. No. 7,360,794, issued Apr. 22, 2008. FIG. 2 of Kohama '794 illustrates the illumination portion of a lighted seat belt buckle. The illumination portion mounts an LED 53 in a holding board that is oriented generally transverse to the insertion direction of the belt tongue, i.e. perpendicular in the FIG. 2 embodiment.

Kohama et al—U.S. Pat. No. 7,347,579, issued Mar. 25, 2008. FIG. 1 of Kohama et al illustrates a variation of the lighted seat belt buckle of Kohama above in which LEDs mounted on holding boards 49a project light onto reflectors 52 embedded in the molded cover of the buckle.

Kohama—U.S. Pat. No. 7,569,265, issued Aug. 4, 2009. Kohama '265 uses the same reflector-based design as FIG. 1 of Kohama et al above, but adds a "Light Intensity Control Device" in series with the LED circuitry to avoid an occurrence of unevenness of brightness. This is shown schematically in FIG. 2(b), where reference numeral 53 designates an LED.

Klick et al—U.S. Pat. No. 7,942,565, issued May 17, 2011. Klick et al discloses several embodiments of an optical waveguide for receiving light from an LED and on the basis of total internal reflection changing the main radiating direction of the electromagnetic light energy.

Line et al—U.S. Pat. No. 9,211,866, issued Dec. 15, 2015. Line et al discloses an illuminated seat belt buckle which is variously described and claimed as illuminating the "vehicle interior," or defining a "flashlight."

Salter et al—U.S. Pat. No. 9,463,734, issued Oct. 11, 2016. Salter et al discloses an illuminated seatbelt assembly in which a "photoluminescent structure" is disposed within a buckle and is configured to luminesce in response to excitation by a light source.

Schmotzer et al—U.S. Pat. No. 9,481,318, issued Nov. 1, 2016. Schmotzer et al discloses a seat belt buckle 10 incorporating a display 14.

As used herein, the term "sensor" is used to describe a circuit or assembly that includes a sensing element and other components. In particular, as used herein, the term "magnetic field sensor" is used to describe a circuit or assembly that includes a magnetic field sensing element and electronics coupled to the magnetic field sensing element.

As used herein, the term "magnetic field sensing element" is used to describe a variety of electronic elements that can sense a magnetic field. The magnetic field sensing elements can be, but are not limited to, Hall effect elements, magnetoresistance elements, or magnettransistors. As is known, there are different types of Hall effect elements, for example, a planar Hall element, a vertical Hall element, and a circular vertical Hall (CVH) element. As is also known, there are different types of magnetoresistance elements, for example, a giant magnetoresistance (GMC) element, an anisotropic magnetoresistance element (AMR), a tunneling magnetoresistance (TMR) element, an Indian antimonide (InSb) sensor, and a magnetic tunnel junction (MTJ).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall elements tend to have axes of sensitivity perpendicular to a substrate, while magnetoresistance elements and vertical Hall elements (including circular vertical Hall (CVH) sensing element) tend to have axes of sensitivity parallel to a substrate.

Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet, and a magnetic field sensor that senses a magnetic field density of a magnetic field.

Despite the teachings of the above patent documents, there is still a need for an easily and inexpensively manufactured assembly configured to form a light pattern proximate an opening slot of a safety belt buckle in a passenger compartment of a vehicle.

SUMMARY

The present invention addresses the design challenges of packaging, energy management and optical quality by providing an assembly that is both space-efficient and energy-efficient.

An illuminable vehicle interior assembly is provided. The assembly includes a vehicle interior part having an opening between inner and outer surfaces of the part. The outer surface faces a passenger compartment of a vehicle. An illumination module is mounted to the inner surface of the part and includes a substrate, a light source supported on the substrate to emit incoherent visible light rays through a light emitting surface of the light source and a driver supported on the substrate to controllably supply electrical power to the light source based on a command signal from a remote electronic control unit over a vehicle bus. A lens is molded in a molding process to have a light transmissive output surface proximate the opening and a light transmissive input surface aligned with the light source. The lens gathers and receives the light rays at the input surface and redirects gathered light rays to the output surface to generate light in a pattern of substantially uniform intensity proximate the opening and into the passenger compartment.

The lens maybe molded from a transparent optical-grade material. The lens may be molded from an optical-grade material which causes the light rays to emerge diffusely from the output surface. The substrate may comprise a printed circuit board (PCB).

The assembly may further comprise a protective layer overlying and protecting the driver and the substrate proximate the light source from external moisture or foreign substances.

The protective layer may be an overmolding encapsulating the driver and the substrate, but does not cover the light emitting surface of the light source.

The assembly may further comprise flexible wiring including a plurality of flexible conductors and insulation surrounding the flexible conductors, the wiring configured to electrically connect the substrate to the remote electronic control unit over the bus.

The assembly may further comprise an opaque layer covering exterior surfaces of the lens, other than the input and output surfaces, to block light rays exiting from the lens except through the output surface.

The lens may include a first layer molded from a transparent optical grade material in the molding process and a second layer bonded to the first layer formed from an opaque material molded onto the first layer in the molding process.

The molding process may be an injection molding process such as a multi-shot molding process.

The substrate may comprise a printed circuit board (PCB) wherein the light source may include a light emitting diode (LED) disposed on the PCB and connectable with the control unit via the driver The output surface may be a class A surface.

The module may be snapped-into engagement with the part at the inner surface of the part.

An illuminable safety belt buckle assembly is provided. The assembly includes a safety belt buckle cover having an opening for receiving a tongue. The opening extends between inner and outer surfaces of the cover. The outer surface faces a passenger compartment of a vehicle. An illumination module is mounted to the inner surface of the cover and includes a substrate, a light source supported on the substrate to emit incoherent visible light rays through a light emitting surface of the light source and a driver supported on the substrate to controllably supply electrical power to the light source based on a command signal from a remote electronic control unit over a vehicle bus. A lens is molded in a molding process to have a light transmissive output surface proximate the opening and a light transmissive input surface aligned with the light source. The lens gathers and receives the light rays at the input surface and redirects gathered light rays to the output surface to generate light in a pattern of substantially uniform intensity proximate the opening and into the passenger compartment.

The lens may be molded from a transparent optical-grade material.

The lens may be molded from an optical-grade material which cause the light rays to emerge diffusively from the output surface.

The substrate may comprise a printed circuit board (PCB).

The assembly may further comprise a protective layer overlying and protecting the driver and the substrate proximate the light source from external moisture or foreign substances.

The protective layer may be an overmolding encapsulating the driver and the substrate, but does not cover the light emitting surface of the light source.

The assembly may further comprise flexible wiring including a plurality of flexible conductors and insulation surrounding the flexible conductors. The wiring may be configured to electrically connect the substrate to the remote electronic control unit over the bus.

The assembly may further comprise an opaque layer covering exterior surfaces of the lens, other than the input and output surfaces, to block light rays exiting from the lens except through the output surface.

The lens may include a first layer molded from a transparent optical grade material in the molding process and a second layer bonded to the first layer and formed from an opaque material molded onto the first layer in the molding process.

The molding process may be an injection molding process such as a multi-shot molding process.

The substrate may comprise a printed circuit board (PCB) wherein the light source may include a light emitting diode (LED) disposed on the PCB and connectable with the control unit via the driver.

The output surface may be a class A surface.

The module may be snapped-into engagement with the cover at the inner surface of the cover.

Other technical advantages will be readily apparent to one skilled in the art from the following figures, descriptions and claims. Moreover, while specific advantages have been enumerated, various embodiments may include all, some or none of the enumerated advantages.

BRIEF DESCRIPTION OF THE DRAWINGS

FIG. 1 is a perspective view of a vehicle seat fitted with a safety belt buckle;

FIG. 2 is a perspective view of the safety belt buckle, removed from the seat, showing the placement of the light output surface of an illuminator assembly proximate the insertion slot for the belt tongue;

FIG. 3 is a schematic perspective view of the interior of the buckle showing the illuminator assembly seated or snapped-into engagement with the buckle housing;

DETAILED DESCRIPTION

Figure 4:
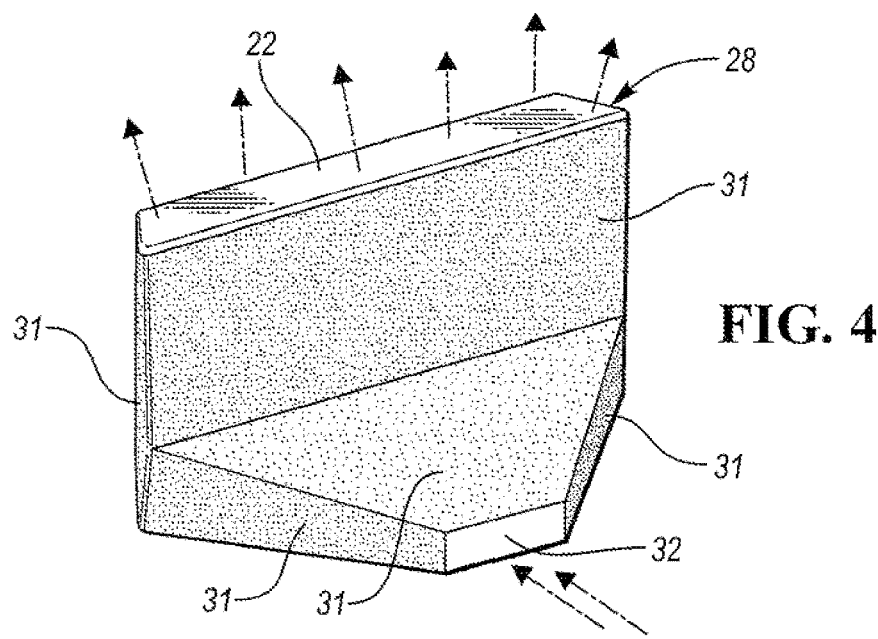
FIG. 4 is a perspective view of the illuminator assembly removed from the buckle housing.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As used in this application, the term "substrate" refers to any non-conductive, flexible, semi-flexible or rigid single or multi-layer component which mechanically supports and electrically connects electronic components and which has one or more surfaces to which a layer or conformed coating is or can be applied hereto and the electronic components by the methods described herein such as, without limitation, polymers and other plastics, as well as composite materials. Furthermore, the shape of the substrate and particularly the surface(s) to be coated or layered can be any part of an assembly or device manufactured by any of various methods, such as, without limitation, conventional molding, extruding, or otherwise fabricated. One preferred application contemplated herein is the coating of substrates and supported electronic components that are automotive components such as automotive interior printed circuit boards and their supported electronic components.

A printed circuit board (PCB) populated with electronic components is commonly called a printed circuit assembly (PCA), a printed circuit board assembly or a PCB assembly (PCBA).

As used herein "potting" is a process of filling a complete electronic assembly with a sold or gelatinous compound for resistance to shock and vibration, and for exclusion of moisture and corrosive agents. Thermosetting plastics on silicone rubber gels are often used. Many sites recommend using silicone or epoxy to protect from impact and loose wires. In the potting process, an electronic assembly is placed inside a mold which is then filled with an insulating liquid compound that hardens permanently protecting the assembly.

The term "overlies" and cognate terms such as "overlying" and the like, when referring to the relationship of one or a first, superjacent layer relative to another or a second, subjacent layer, means that the first layer partially or completely lies over the second layer. The first, superjacent layer overlying the second, subjacent layer may or may not be in contact with the subjacent layer; one or more additional layers may be positioned between respective first and second, or superjacent and subjacent, layers.

With reference to FIG. 1, a conventional vehicle seat 10 is fitted with a safety belt buckle 12. The buckle 12 is adapted to latch and unlatch the tongue 11 of a belt 13 with an internal mechanism (not shown).

FIG. 2 shows the safety belt buckle 12 separate from the vehicle seat. The buckle 12 has a housing formed by mating halves 14 and 16, whose connection defines a seam line 18. At the open end of the buckle 12 is a slot 20 for passage of the belt tongue 11. An output surface 22, i.e., light-emitting surface of a waveguide lens, is proximate the slot 20.

FIG. 3 is a schematic perspective view of the bottom half 14 of the buckle housing, separated from the top half. An illuminator assembly or module, indicated generally at 24, is seated (i.e. snapped-into engagement with the buckle half 14) in a complementary-shaped compartment in the housing member 14. The output surface 22 of a waveguide lens 28 is located at the open end of the housing member 14.

Figure 5:
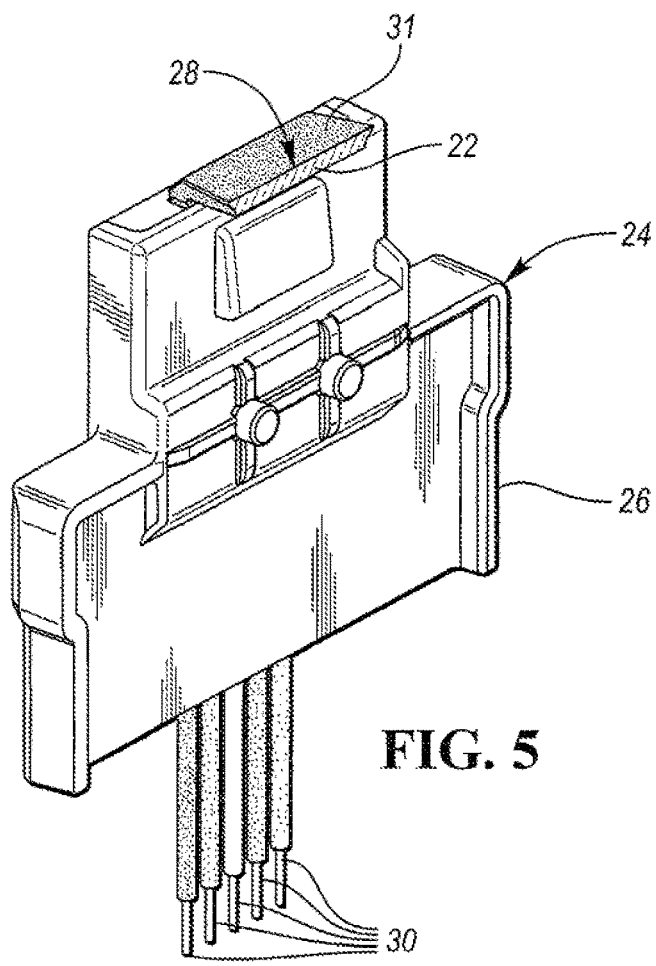
FIG. 5 is a perspective view of the illuminator lens which functions as a waveguide to route light rays emitted by a lamp such as an LED in a generally orthogonal direction.
Figure 6:
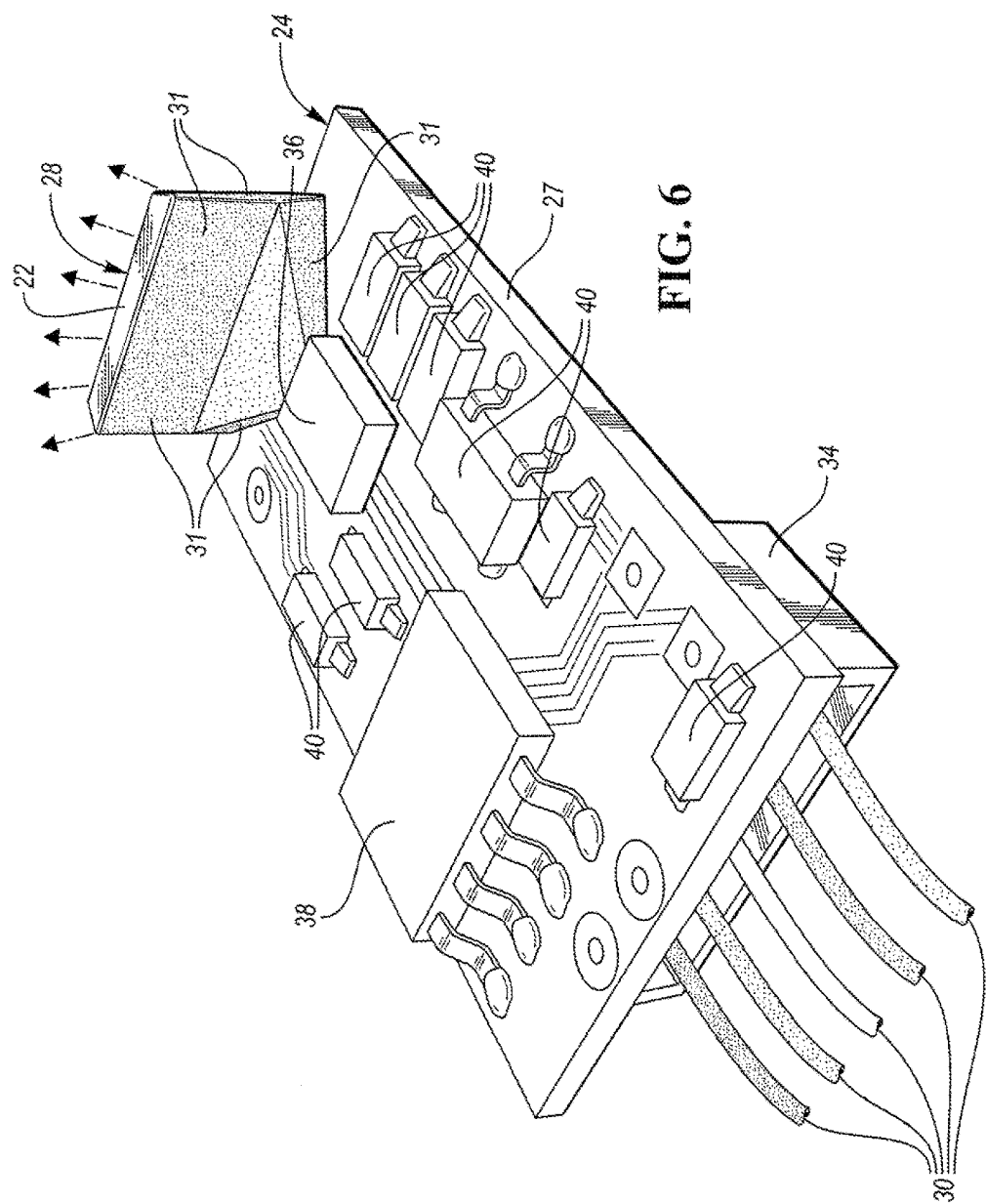
FIG. 6 is a schematic view of the layout of electronic components mounted on a printed circuit board (PCB) within the illuminator assembly.

FIG. 4 shows the lens 28 of the illuminator assembly 24 separate from the buckle 12. The assembly 24 is preferably formed of a molded plastic body 26 or cover layer as shown in FIG. 5 over a printed circuit board (PCB) 27 as shown in FIG. 6. A group of electrical leads 30 are connected to the assembly 24. The leads 30 can be assigned to power supply, ground, a local interconnect network (known as "LIN", standardized as ISO/AWI 17987-8) and a Hall effect sensor to response to the presence of the tongue 11 within the buckle 12 (two leads).

The waveguide lens 28 is shown fitted in the plastic body 26. The light-emitting class A surface 22 is proximate the slot 20 in the buckle 12 for passage of the belt tongue 11 as best shown in FIGS. 2 and 3.

FIG. 4 shows the waveguide lens 28 separate from the illumination assembly 24. An input surface 32 receives light rays emitted through the light-emitting surface of a light source such as an LED 36 as show in FIG. 6. The waveguide lens 28 is configured to guide or direct the projected light rays received at surface 32 by internal reflection to the light-emitting output surface 22. The lens 28 may be formed of a transparent or light-diffusing optical-grade material such as PMMA (polymethyl methacrylate) or PC (polycarbonate) in a molding process. If a light-diffusing material is used, light rays emerge diffusely from the output surface 22. The other exterior surfaces of the first layer of the lens 28 are coated with an opaque color material layer 31 to contain and direct the light rays and reflect/direct the light rays within the lens 28. The layer 31 may be white in color and can be characterized as a skin.

The second layer 31 of the lens 28 is bonded to the first layer of the lens 28 and is formed from a diffuse material molded onto the lens 28 in the molding process.

The molding process is preferably an injection molding process such as a multi-shot molding process. Consequently, the lens 28 can be characterized as a 2-shot, dual-molded lens.

Figure 7:
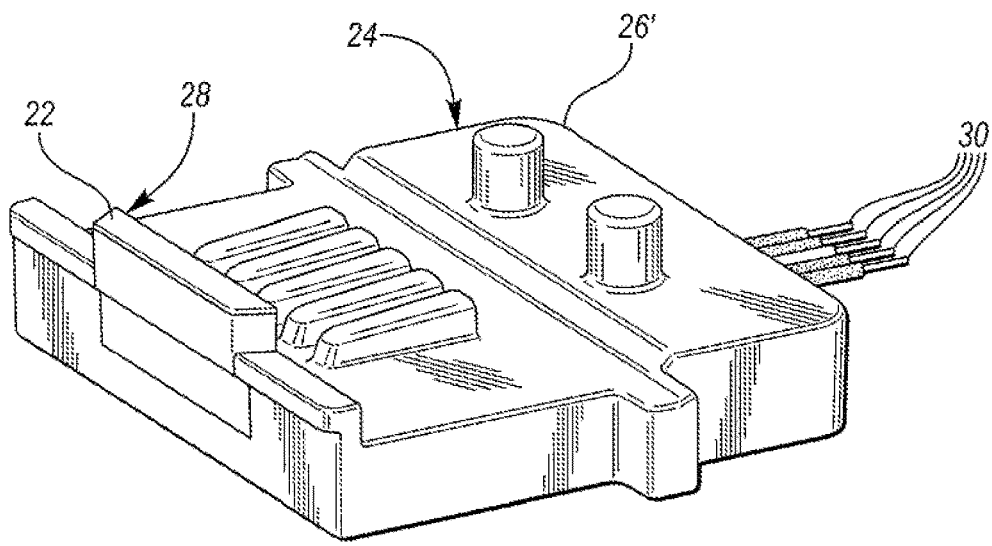
FIG. 7 is a schematic perspective view of another embodiment of the illuminator assembly.
Figure 8:
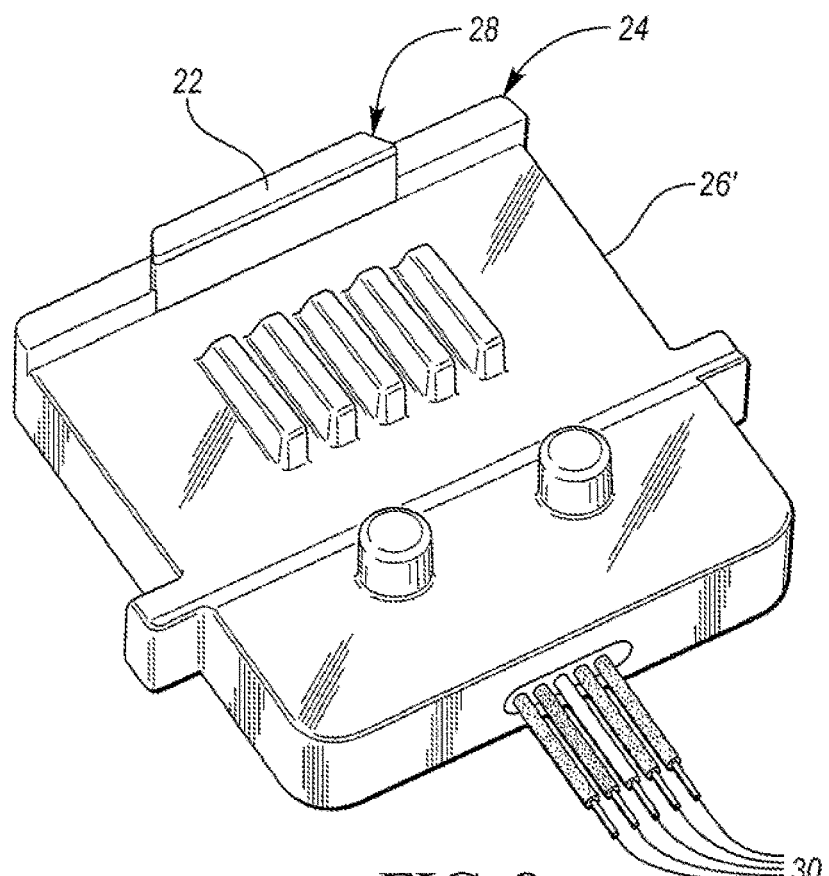
FIG. 8 is a view, similar to the view of FIG. 7, but from a different angle.

As shown in FIGS. 7 and 8, second embodiment of a molded plastic cover layer 26' may be provided for the printed circuit board (PCB) 27 which carries the LED 36 and a driver 38 for the LED 36 and may be provided in the same shot as the shot which provides the second layer 31. The PCE 27 also carries varies other electronic components 40 such as capacitors, resistors, and diodes for enabling operation of the LED 36 and the driver 38.

The cover layer 26' may be a thermoplastic elastomer (TPE) which is a class of polymers that behave like thermoset rubber but that, above their melt or softening temperatures, are melt processable via thermoplastic processing methods and can be easily reprocessed and remolded. The ability to process these materials with thermoplastic methods allows for design and fabrication freedom.

Bondable thermoplastic elastomer compounds may be formulated to provide a chemical bond to plastic substrates, such as TPE substrates, making possible simpler part designs that are less dependent on mechanical interlocks or require time consuming surface preparation during production.

These compounds are compatible with inert or multi-shot molding methods and are ideal for applications where a "soft-touch" feature can provide an ergonomic touch or enhance consumer appeal, dampen sound or vibration, or provide impact or shock protection. Also, such compounds are elastic.

A thermoplastic elastomer (TPE) of at least one embodiment of the present invention may be selected from the group consisting of a thermoplastic polyolefin, thermoplastic urethane, polyester, polycarbonate, acrylonitrile/butadiene/styrene ("ABS"), polypropylene, lomod, bexloy, mixture of acrylonitrile/butadiene/styrene (i.e., ABS) and polycarbonate, and mixtures thereof.

As noted above, the lens 28 is typically molded from a transparent, optical grade polymer such as clear PMMA or PC. Alternatively, the lens 28 may be molded from a diffused or diffusing polymer such as PMMA or PC with a light diffusing additive such as self-reflecting particles.

FIG. 6 is a schematic representation of electronic components of the illuminator assembly 24 shown in cooperative relationship. The components are mounted on a base 58 including a substrate or printed circuit board (PCB) 38 which, in turn, supports and electrically interconnects the electrical components to form a printed circuit board assembly (PCBA). A terminal set 30 is received by a terminal block 34 supported on the printed circuit board 27. A side-emitting light emitting diode (LED), schematically included at 36, emits light rays which are received at the input surface 32 of the waveguide lens 28. The LED 36 is supported on the printed circuit board and is electrically connected to the LED driver also supported on the PCB 38. The waveguide lens 28 is configured to guide or direct the light rays to the output surface 22 in a direction generally orthogonal to the direction of the light rays emitted by the LED 36. Alternatively, a top-emitting LED may be fired directly into the lens 28 (i.e. optic) placed over the PCB 38.

The illuminator assembly 24 is suitable for use with an automobile, which can be any passenger vehicle used for land transportation, such as a car, minivan, truck, etc. According to alternative embodiments, the assembly 24 may be used with any type of vehicle, such as water vehicles, air vehicles, etc.

The illuminator assembly 24 may be electrically connected to a main controller of an electrical system of the vehicle. The main controller is typically electrically connected to one or more switches and/or one or more sensors so that the assembly 24 can be manually or automatically operated to turn the assembly 24 "on" or "off". For example, the main controller can be electrically connected to an ignition switch, a light sensor, a headlight switch and/or an interior light switch as needed and/or desired.

The printed circuit board assembly (PCBA) may include the driver 38 or controller coupled to the main controller of the vehicle. The driver 38 may comprise one or more analog and/or digital electrical or electronic components, and may include a microprocessor, microcontroller, application-specific integrated circuit (ASIC), programmable logic, and/or other circuit elements. According to an exemplary embodiment, the driver 38 may be configured to receive data via one or more electrical wires or buses such as the leads 30 from a plurality of automobile systems within the automobile. For example, the driver 38 can be configured to receive data from sensors on an automobile. According to various exemplary embodiments, the printed circuit board 27 may be a flexible circuit board, a rigid circuit board, conductive foil, and/or other suitable form.

In one exemplary embodiment, the PCB assembly includes the LED driver 38 having a power source and LED control circuitry to operate the LED 36. The LED driver 38 may be an LIN LED driver including a LIN transceiver, a LIN protocol/controller and a microcontroller (MCU).

The light source 36 may include an incandescent bulb, a fluorescent bulb, the light emitting diode (LED), a light pipe, an electroluminescent device, a neon or argon bulb or fiber optics. The light source(s) may produce light of any color or from any portion of the light spectrum. In various exemplary embodiments, a light filter (not shown) may be placed between the light source 36 and the lens 28.

The ECU of the vehicle and the LED driver 38 or controller are typically connected via a vehicle bus such as a local interconnect network (LIN or CAN) line or bus capable of two-way communications. LIN is one of many possible in-vehicle local area network (LAN) communications protocols. A power line and a ground line may be provided between the ECU and the controller 38 (via leads 30). The controller typically includes a transceiver interface within the MCU, a microprocessor and its control logic within the MCU, the drive or driver, and an electrical power source. The controller 38 may be integrated or physically coupled with the LED 36 in the cover layer or housing 26 or 26', while the ECU is provided some distance away from the cover layer or housing 26 or 26'.

The power source or circuit of the controller 38 supplies electric power of predetermined voltage levels to the MCU and the Hall Effect sensor(s) through the drive or driver 28. The transceiver within the MCU is a communications interface circuit connected to the network or vehicle bus for communications and operates as a receiver section for the MCU and a transmitter section back to the ECU. The driver 38 typically includes the driver circuit for driving the LED 36.

The Hall Effect sensor(s) are typically provided near or coupled to the housing adjacent the opening 20 and may be driven to generate pulse signals which are received by the MCU.

The MCU of the driver 38 typically includes a memory and may be configured as a conventional microcomputer including a CPU, a ROM, a RAM and the like or as a hardwired logic circuit.

The ECU and the controller 38 may perform data communications regularly through the LIN or CAN bus. In such data communications, the controller or driver 38 may transmit state data indicating the state of the LED 36 to the ECU.

The ECU and/or the controller 38 may confirm the desired state of the LED 36. The state of the ECU is based on various states detected by non-contact position sensor(s), commands and the present state of the LED 36, to generate commands.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An illuminable safety belt buckle assembly comprising:
a safety belt buckle cover having an opening for receiving a tongue, the opening extending between inner and outer surfaces of the cover, the outer surface facing a passenger compartment of a vehicle;
an illumination module mounted to the inner surface of the cover and including a substrate, a light source supported on the substrate to emit incoherent visible light rays, and a driver supported on the substrate to controllably supply electrical power to the light source based on a command signal from a remote electronic control unit over a vehicle bus; and
a waveguide lens having a light transmissive input surface oriented to receive the visible light rays emitted by the light source and route the visible light rays to a light transmissive output surface oriented substantially orthogonally to the input surface, the waveguide lens gathering and receiving the light rays at the input surface and redirecting them by internal reflection to the output surface to illuminate the area proximate the outer surface.

2. The assembly as claimed in claim 1, wherein the waveguide lens comprises an integral body injection molded from a transparent optical-grade plastic.

3. The assembly as claimed in claim 2, wherein the waveguide lens body is molded from an optical-grade plastic which cause the light rays to emerge diffusively from the output surface.

4. The assembly as claimed in claim 1, wherein the waveguide lens body has a coating of optically opaque material on its exterior exclusive of the input surface and the output surface.

5. The assembly as claimed in claim 1, further comprising a protective layer overlying and protecting the driver and the substrate proximate the light source from external moisture or foreign substances.

6. The assembly as claimed in claim 5, wherein the protective layer is an overmolding encapsulating the driver and the substrate, that does not cover the light source.

7. The assembly as claimed in claim 1, further wherein the light source is a side-emitting light emitting diode.

8. The assembly as claimed in claim 1, further comprising an opaque skin injection molded onto exterior surfaces of the waveguide lens body, other than the input and output surfaces.

9. The assembly as claimed in claim 1, wherein the waveguide lens includes a first layer injection molded from a transparent optical grade plastic in the molding process and a second layer bonded to the first layer and formed from an opaque material molded onto the first layer in the molding process.

10. The assembly as claimed in claim 9, wherein the molding process comprises a multi-shot injection molding process.

11. The assembly as claimed in claim 1, wherein the substrate comprises a printed circuit board (PCB) and wherein the light source includes a light emitting diode (LED) disposed on the PCB and connectable with the control unit via the driver.

12. The assembly as claimed in claim 1, wherein the output surface is a class A surface.

13. The assembly as claimed in claim 1, wherein the module is snap-fittable-into engagement with the cover at the inner surface of the cover.

* * * * *

UNITED STATES PATENT AND TRADEMARK OFFICE
CERTIFICATE OF CORRECTION

PATENT NO. : 10,259,387 B1
APPLICATION NO. : 15/784413
DATED : April 16, 2019
INVENTOR(S) : Ingo E. Schneider et al.

Page 1 of 1

It is certified that error appears in the above-identified patent and that said Letters Patent is hereby corrected as shown below:

In the Specification

Column 1, Line 6:
Delete "This application is a continuation-in-part application of U.S. patent application Ser. Nos. 15/637,054 and 15/677,517, both filed on June 29, 2017."

Signed and Sealed this
Thirteenth Day of August, 2019

Andrei Iancu
*Director of the United States Patent and Trademark Office*